(12) United States Patent
Kobayashi et al.

(10) Patent No.: US 8,056,366 B2
(45) Date of Patent: Nov. 15, 2011

(54) METHOD FOR PREHEATING GLASSMAKING MATERIALS

(75) Inventors: Hisashi Kobayashi, Putnam Valley, NY (US); Kuang Tsai Wu, Williamsville, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 12/776,841

(22) Filed: May 10, 2010

(65) Prior Publication Data

US 2010/0212362 A1    Aug. 26, 2010

Related U.S. Application Data

(63) Continuation of application No. 11/394,229, filed on Mar. 31, 2006, now abandoned.

(51) Int. Cl.
   *C03B 1/00* (2006.01)
   *C03B 5/16* (2006.01)
(52) U.S. Cl. ..................... 65/136.1; 65/134.4
(58) Field of Classification Search .............. 65/134.4, 65/134.6, 135.9, 136.1
   See application file for complete search history.

(56) References Cited

U.S. PATENT DOCUMENTS

| 4,045,197 | A | 8/1977 | Tsai et al. |
| 4,285,718 | A | 8/1981 | Mathias et al. |
| 4,303,434 | A | 12/1981 | Rough et al. |
| 4,306,899 | A | 12/1981 | Richards |
| 4,310,342 | A | 1/1982 | Richards |
| 4,330,315 | A | 5/1982 | Nelson et al. |
| 4,875,919 | A | 10/1989 | DeSaro et al. |
| 5,006,141 | A | 4/1991 | Chen et al. |
| 5,125,943 | A | 6/1992 | Cole |
| 5,412,882 | A | 5/1995 | Zippe et al. |
| 5,526,580 | A | 6/1996 | Zippe et al. |
| 5,713,977 | A | 2/1998 | Kobayashi |
| 5,785,940 | A | 7/1998 | Carroll et al. |
| 5,807,418 | A | 9/1998 | Chamberland et al. |
| 5,954,851 | A | 9/1999 | Sakee |
| 5,992,041 | A | 11/1999 | McClaine et al. |
| 6,289,694 | B1 | 9/2001 | Pieper |

FOREIGN PATENT DOCUMENTS

| DE | 3338804 | 5/1985 |
| DE | 19547186 | 12/1996 |
| EP | 0700876 B1 | 3/1996 |
| EP | 0 995 495 | 4/2000 |
| GB | 2014127 A | 8/1979 |

OTHER PUBLICATIONS

DE 195 47 186 C1 (Pieper). English language translation of patent previously cited on applicant's IDS dated Aug. 13, 2010.*
C. P. Ross et al. "Glass Melting Technology: A Technical and Economic Assessment", Glass Manufacturing Industry Council, Oct. 2004, pp. 73-80.
Gunther Lubitz et al. "Oxy-fuel Fired Furnace in Combination with Batch and Cullet Preheating", Novem Energy Efficiency in Glass Industry, Abstract, (2000).

* cited by examiner

*Primary Examiner* — Matthew Daniels
*Assistant Examiner* — Erin Snelting
(74) *Attorney, Agent, or Firm* — Donald T. Black

(57) ABSTRACT

Heat in a stream of combustion products obtained from a glassmelting furnace heated by oxy-fuel combustion is passed to incoming glassmaking materials in a heat exchanger without requiring reduction of the temperature of the stream yet without causing softening of the glassmaking material.

18 Claims, 7 Drawing Sheets

METHOD FOR PREHEATING GLASSMAKING MATERIALS

RELATED APPLICATIONS

This application is a continuation of, and claims priority from, application Ser. No. 11/394,229, filed Mar. 31, 2006 now abandoned.

FIELD OF THE INVENTION

The present invention relates to the production of glass, and more particularly to the heating of glassmaking material by heat exchange with combustion products (flue gas) formed in the combustion that is carried out to generate heat for melting the glassmaking material.

BACKGROUND OF THE INVENTION

Conventional glassmaking methods require establishing in a glass melting furnace temperatures that are high enough to melt the glassmaking material (by which is meant one or more materials such as sand, soda ash, limestone, dolomite, feldspar, rouge, which are collectively known as "batch" and/or broken, scrap and recycled glass, known as "cullet"). The required high temperature is generally obtained by combustion of hydrocarbon fuel such as natural gas. The combustion produces gaseous combustion products, also known as flue gas. Even in glassmaking equipment that achieves a relatively high efficiency of heat transfer from the combustion to the glassmaking materials to be melted, the combustion products that exit the melting vessel typically have a temperature well in excess of 1093° C. (2000° F.), and thus represent a considerable waste of energy that is generated in the glassmaking operations unless that heat energy can be at least partially recovered from the combustion products. The prior art has addressed this problem by using flue gas to air heat exchangers known as regenerators. In a conventional air fired regenerative furnace, waste heat in the flue gas is partially recovered in the regenerators by preheating the incoming combustion air and the exit temperature of the flue gas after passing through the regenerators is reduced to about 427 to 538° C. (800 to 1000° F.).

Combustion of the hydrocarbon fuel with gaseous oxidant having an average of at least 35 volume percent oxygen (known as "oxy-fuel combustion") provides to the glassmaking operation numerous advantages compared to combustion of the fuel with air. Among those advantages are higher flame temperature, which affords higher heat transfer and shorter melting times, and reduced overall volume of the gaseous combustion products that exit the glass melting furnace, which affords a reduction in the size of the gas-handling equipment that is needed. The gaseous combustion products formed in combustion with oxidants having such higher oxygen content can exhibit temperatures of 982° C. (1800° F.) or higher, even 1093° C. (2000° F.) or higher. Thus, the gaseous combustion products of oxy-fuel combustion contain even more heat energy, compared to the combustion products of conventional air-fired combustion, which should be used to advantage to improve the overall energy efficiency of the glassmaking operation.

While the glassmaking art is aware of using heat in the hot gaseous combustion products from the glass melting furnace to preheat incoming glassmaking material which is to be melted in the manufacture of the glass, the heretofore known technology has believed that the temperature of the hot combustion products should not exceed about 538 to 704° C. (1000 to 1300° F.) as it is fed commences heat exchange with the glassmaking material. This maximum temperature is imposed by considerations of the capability of the materials from which the heat exchanger is constructed to withstand higher temperatures, and considerations of the tendency of the glassmaking material to begin to soften and become adherent (or "sticky") if it becomes too hot during the heat exchange step, leading to reduced throughput and even plugging of the heat exchanger passages. The temperature at which the glassmaking material becomes adherent or sticky depends on the batch composition and the material in contact with the glassmaking material and is believed to be in a range between 538 to 704° C. (1000 to 1300° F.) for a common batch to make soda lime glass for bottles and windows. In a conventional air fired regenerative furnace, the flue gas exit temperature after the regenerators is about 427 to 538° C. (800 to 1000° F.) and there is no need to cool down the flue gas prior to a batch/cullet preheater.

When the gaseous combustion products are those obtained by oxy-fuel combustion, the conventional belief has been that they need to be cooled to the range of from 538 to 704° C. (1000 to 1300° F.) before heat exchange with the incoming glassmaking materials can commence. Numerous examples exist showing the prior art's belief that the temperature of the flue gas must be reduced before the flue gas is used to heat incoming glassmaking materials. Such examples include C. P. Ross et al., "Glass Melting Technology: A Technical and Economic Assessment", Glass Manufacturing Industry Council, August 2004, pp. 73-80; G. Lubitz et al., "Oxy-fuel Fired Furnace in Combination with Batch and Cullet Preheating", presented at NOVEM Energy Efficiency in Glass Industry Workshop (2000), pp. 69-84; U.S. Pat. Nos. 5,412,882; 5,526,580; and 5,807,418.

However, reducing the temperature of this stream of combustion products by adding to it a gaseous diluent such as air, and/or spraying a cooling liquid such as water into the stream, is disadvantageous as such approaches reduce the amount of recoverable heat remaining in the gaseous combustion products, increase the size of the gas handling equipment that is needed, and adds additional equipment and process expense.

Thus, there remains a need in this field for method and apparatus permitting practical and efficient heat exchange from the gaseous combustion products of oxy-fuel combustion to glassmaking material, which can be practiced even at the relatively higher temperatures encountered when using oxy-fuel combustion in glassmaking operations.

BRIEF SUMMARY OF THE INVENTION

One aspect of the invention is a glass melting method comprising (A) passing heated glassmaking material into a glass melting furnace;

(B) combusting fuel with oxidant having an overall average oxygen content of at least 35 vol. % oxygen to produce heat for melting said heated glassmaking material in said glass melting furnace and produce hot combustion products having a temperature greater than 982° C. (1800° F.)

(C) withdrawing said hot combustion products from said glass melting furnace and feeding said hot combustion products into a first passageway of a heat exchange unit, wherein the temperature of said hot combustion products entering said first passageway is at least 982° C. (1800° F.);

(D) flowing said hot combustion products through and out of said first passageway;

(E) feeding glassmaking material into and through a second passageway of said heat exchange unit that is separated from said first passageway by a barrier through which said glassmaking material and said hot combustion products cannot pass and through which heat from said hot combustion products passes to said glassmaking material to form said heated glassmaking material; and (F) maintaining the heat flux from hot combustion products in said first passageway to said barrier sufficient that the temperature of the surface of said barrier that is in contact with said glassmaking material does not exceed 871° C. (1600° F.) and that the temperature of said glassmaking material does not reach or exceed the temperature at which the glassmaking material becomes adherent.

As used herein, that glassmaking material is "adherent" means that when 250 grams of the glassmaking material which is in free-flowing particulate form at room temperature is heated to a given temperature in a metal container made of the same material as the barrier that the material is to flow past and is held at that temperature for 30 minutes and the container is then inverted, at least 1% of the material adheres to the surface of the container; and the temperature at which the material "becomes adherent" is the lowest temperature at which the material is thus "adherent" when it is heated to that temperature.

DETAILED DESCRIPTION OF THE INVENTION

Figure 1:
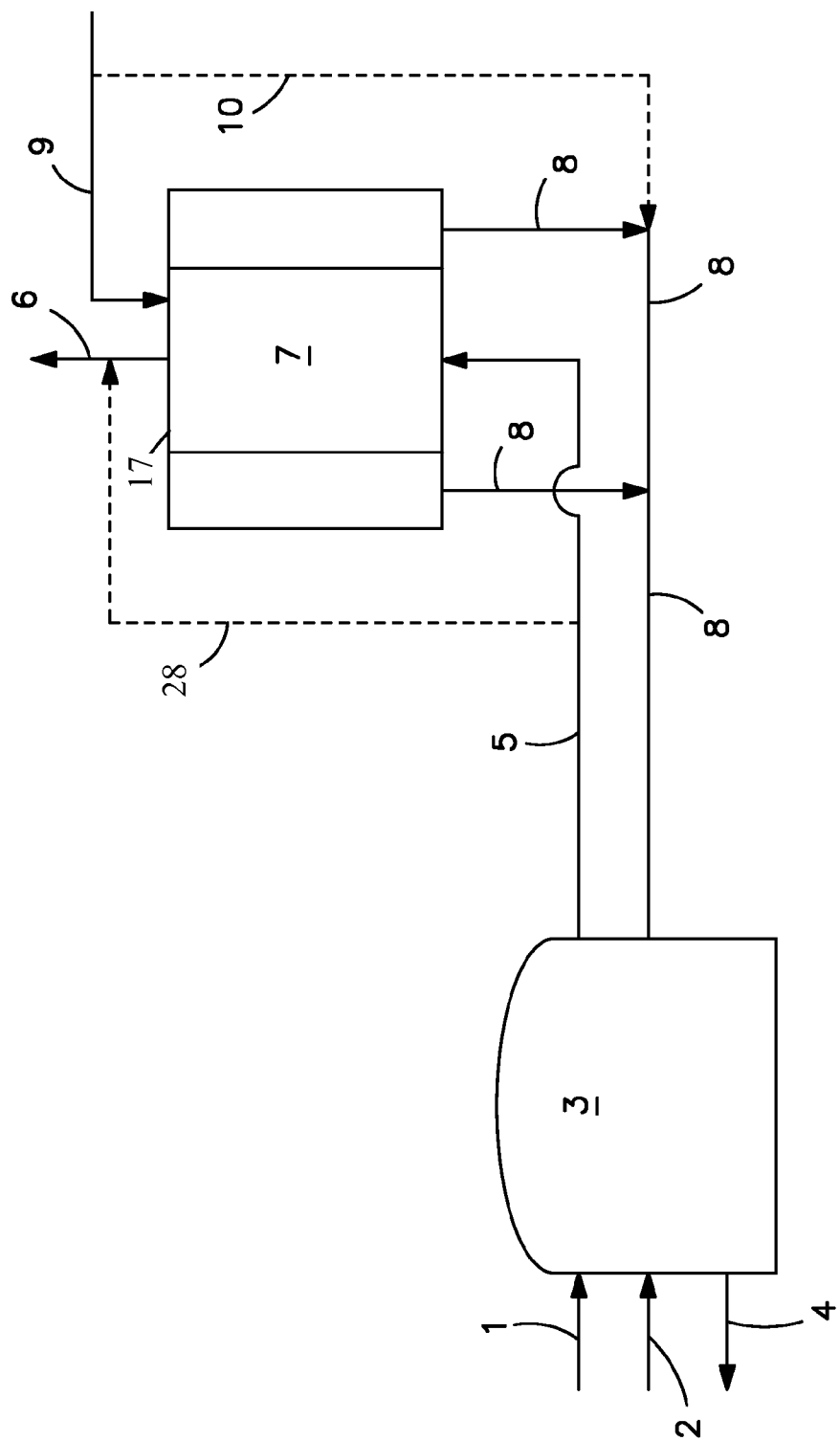
FIG. 1 is a schematic view of glassmaking apparatus with which the method of the present invention can be practiced.

Referring to FIG. 1, fuel stream 1 and gaseous oxidant 2 are fed to glass melting furnace 3 and combusted therein to generate sufficient heat to melt the glassmaking material present within furnace 3. Stream 4 of molten glass can be recovered from glassmaking furnace 3.

Suitable fuels include any that can be combusted with oxygen to generate the required amount of heat of combustion. Preferred fuels include gaseous hydrocarbons, such as natural gas.

The oxidant depicted as stream 2 can be fed as one stream to a solitary burner within furnace 3, but is more often provided as a plurality of streams to each of several burners within furnace 3. Considered over the aggregate of all such gaseous streams, the overall average oxygen content of all streams fed to and combusted in furnace 3 should be at least 35 volume percent oxygen, and more preferably at least 50 volume percent oxygen. That is, the oxygen contents of the oxidant streams fed to different burners may differ from one another, for instance if the operator desires to have some burners (to which a higher oxygen content is fed) burn hotter than other burners. The preferred manner of obtaining a gaseous oxidant stream containing a desired oxygen content is to mix air and a gas having an oxygen content higher than that of air (such as a stream of 90 volume percent oxygen) either upstream from a particular burner or at the burner outlets.

Combustion of the fuel and oxidant produces stream 5 of hot gaseous combustion products which is removed from furnace 3 and fed to heat exchange unit 7, which is described further hereinbelow, from which stream 6 of cooled gaseous combustion products emerges. Optional bypass stream 28 carries hot combustion products from stream 5 to join exit stream 6 without passing through heat exchange unit 7.

Stream 8 of heated glassmaking material to be fed to furnace 3 and melted in furnace 3 is obtained by passing glassmaking material fed as stream 9 through heat exchange unit 7. Optional bypass stream 10 denotes glassmaking material that is combined with heated glassmaking material in stream 8, to be fed also to furnace 3, but which is not passed through heat exchange unit 7. Stream 9 and optional stream 10 typically receive the glassmaking material from suitable bins and feeders of conventional design.

Figure 2:
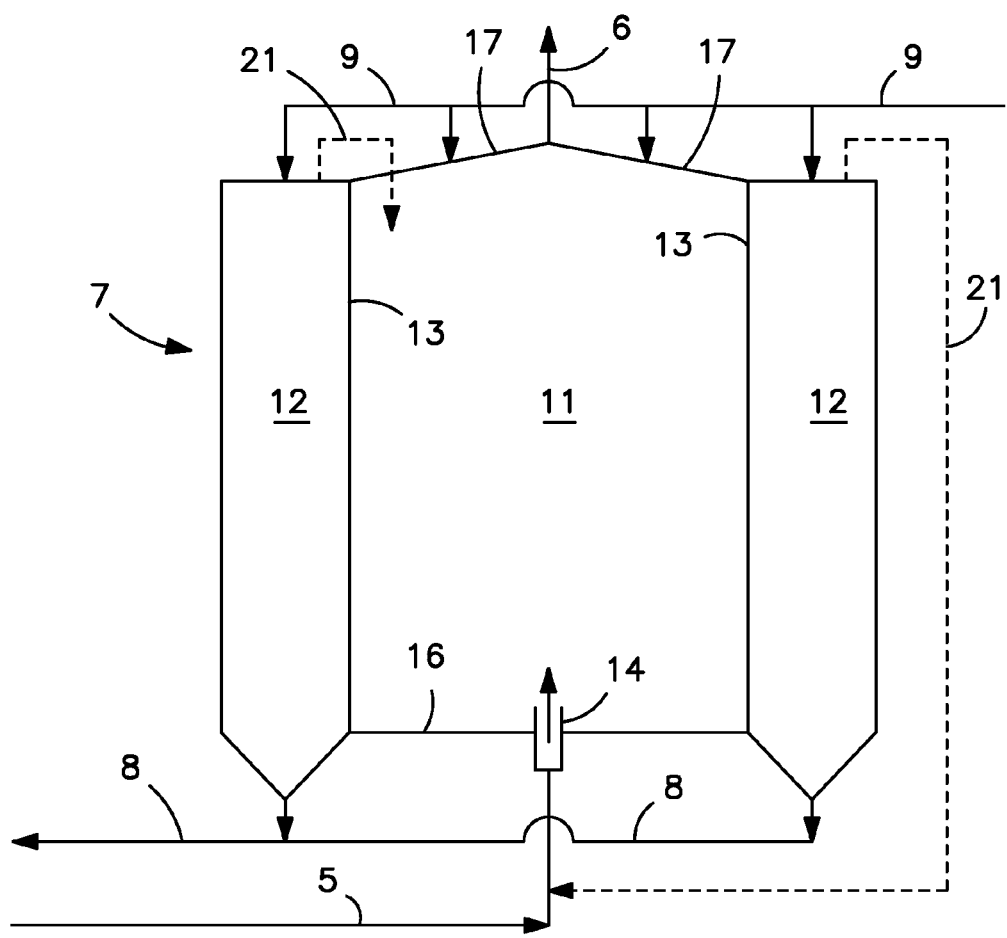
FIG. 2 is a cross-sectional view of a heat exchange unit useful in the practice of the present invention.

FIG. 2 illustrates one preferred embodiment of heat exchange unit 7. Typically, the unit is cylindrical or rectangular in its horizontal cross-section. In the embodiment shown in FIG. 2, passageway 11 is surrounded by one or more passageways 12 which are separated from passageway 11 by barrier 13. Considered in its simplest form, this embodiment of heat exchange unit 7 is a heat exchanger which enables heat to be exchanged from passageway 11 through barrier 13 to passageway or passageways 12 in indirect heat exchange (by which is meant that heat can pass through barrier 13 without direct physical contact between the combustion products and the glassmaking material, because gaseous, liquid or solid materials cannot pass through barrier 13). The heat exchange unit 7 can have a horizontal cross-sectional shape which is circular, rectangular, or any other geometric configuration, although circular and rectangular, particularly square, are preferred. There can be one passageway 12 completely surrounding passageway 11, or passageway 12 can be divided into two or more such passageways by appropriately positioned vertical dividers within the space immediately surrounding passageway 11.

Stream 5 of hot combustion products from the glass melting furnace is fed through an inlet nozzle 14 in the bottom of unit 7 into the interior of passageway 11. Advantageously, stream 5 is conveyed to the heat exchange unit 7 in a pipe that has a suitable heat-resistant refractory interior lining that can withstand the high temperature of this stream. Stream 5 as it enters passageway 11 is at a temperature of at least 982° C. (1800° F.) and may be over 1093° C. (2000° F.) or even over 1204° C. (2200° F.). Thus, one advantage of the practice of the present invention is that it can be carried out without requiring any significant reduction in the temperature of the hot combustion products before beginning to transfer heat from the hot combustion products to the glassmaking material. Significantly, no addition of dilution air or other cooling media to stream 5, between the glass melting furnace and unit 7, is necessary.

Figure 5:
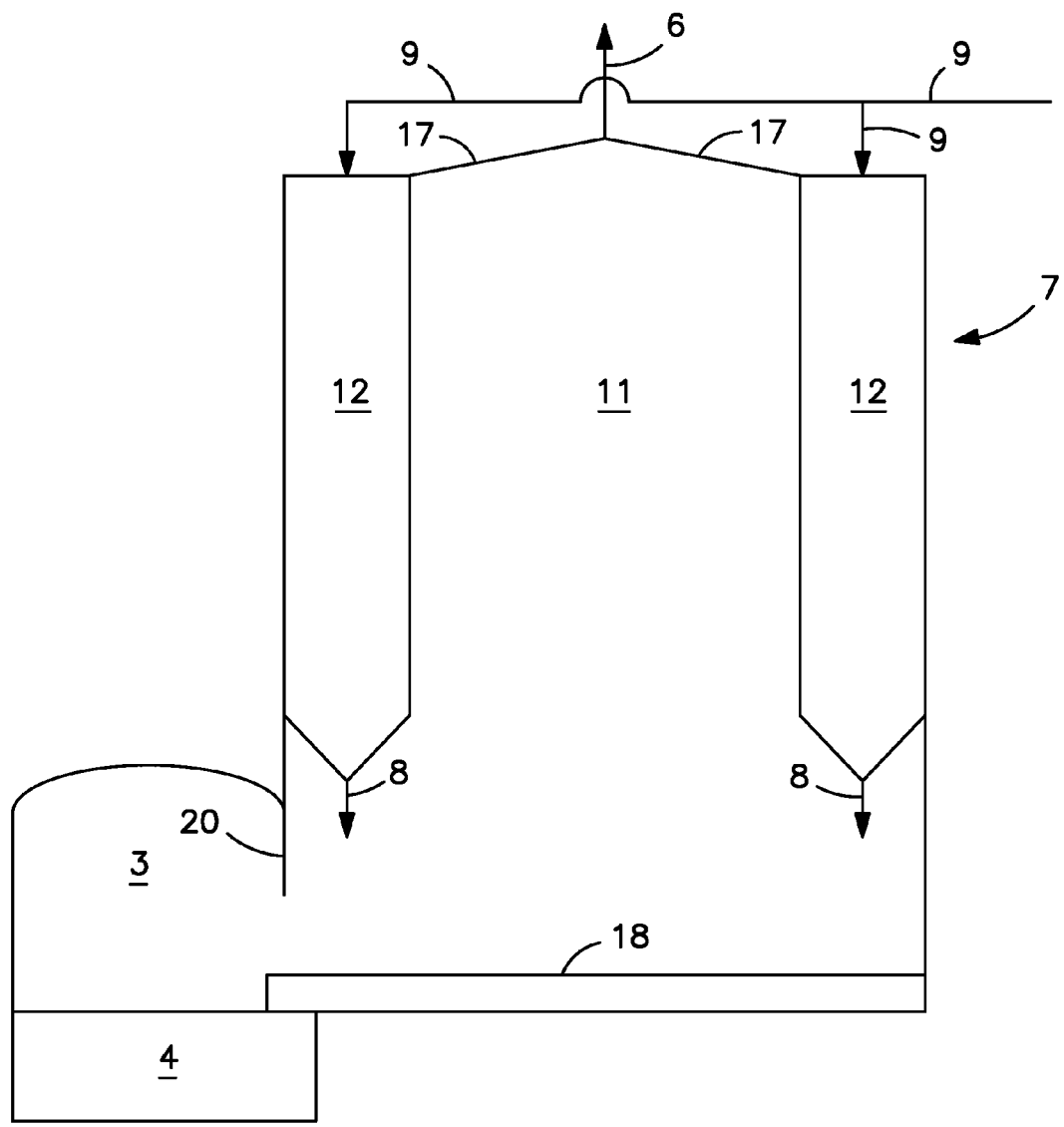
FIG. 5 is a cross-sectional view of an alternative apparatus useful in the practice of the present invention.

As seen in FIG. 2, the stream 9 of incoming glassmaking material to be preheated is fed to the passageway or passageways 12. Streams 9 can be fed into passageways outside the sides of the unit 7, or can be fed on top of upper surface 17 if that surface is sloped, so that the material moves along the sloped surface, toward and then into passageway(s) 12 The glassmaking material is preferably of a size, ranging from small pieces of cullet down to finely divided particulate glassmaking material, such that the glassmaking material is able to pass downwardly through the passageway or passageways 12 under the influence of gravity. As the glassmaking material passes through passageway or passageways 12, its temperature increases by virtue of the flow of heat from the hot combustion products in passageway 11 through barrier 13. The thus heated glassmaking material exits heat exchange unit 7 as stream 8 which can then be fed to the glass melting furnace. An alternative treatment of the heated glassmaking material is illustrated in FIG. 5 and discussed hereinbelow. Stream 6 of cooled combustion products exits the heat exchange unit 7 through top 17 at a temperature of typically 760° C. (1400° F.) or less, although the temperature at this point can be adjusted depending upon the operational characteristics of heat exchange unit 7 and depending on whether the operator wishes to pass this stream to another unit from which additional heat can advantageously be drawn from stream 6, such as another heat exchange unit which passes heat to incoming glassmaking material or to one or more streams of oxidant to be employed in the combustion that is carried out in glassmaking furnace 3. If desired, one or more off-gas streams 21 are drawn from the passageway(s) through which the incoming glassmaking materials pass, such as passageways 12 in this embodiment, preferably being drawn at the upper end, and are fed to stream 5, or to the passageway through which the hot combustion gases pass (passageway 11 in this embodiment), or to an incinerator or other unit to oxidize, decompose or otherwise remove undesirable components from the off-gas (such as water vapor, organic fumes or byproducts that were present on the incoming cullet materials).

Stream 9 can, as indicated above, be obtained from a storage bin or similar apparatus which provides the glassmaking material, or it can be obtained as a stream of heated material exiting another heat exchange unit in which the glassmaking material is preliminarily heated, for instance by heat exchange with hot combustion products such as stream 6.

Heat exchange unit 7 can be constructed of any material that is capable of withstanding the temperatures encountered in the operation described herein. Preferably, barrier 13 is made of metal, such as carbon steel, stainless steel, or other high temperature alloys. The top and bottom of unit 7 should be made of insulating ceramic materials. The top 17 may be flat as shown in FIG. 1 or as shown in FIG. 2. The housing surrounding the exterior of passageway or passageways 12 can be made of metal or refractory bricks. Nozzle 14 is preferably constructed of ceramic material that can withstand the temperature of the incoming hot combustion product stream.

The glassmaking material can be fed through the passageway or passageways 12 at a rate such that those passageways are essentially filled by a packed, moving bed or a fluidized bed of glassmaking material being heated. Preferably, however, to achieve faster heat transfer and to reach greater uniformity of the temperature to which the glassmaking material is heated, the glassmaking material is fed in a fluidized bed of glassmaking material being heated, or in a dispersed manner such that discrete particles of material fall through the space in passageway or passageways 12 as a "raining" flow of material. The efficiency of heat transfer to the glassmaking material in the raining flow can be enhanced even further by providing appropriate baffles such as downwardly concave angle irons disposed in the path of the falling particles, to deflect them from their paths thereby increasing residence time and enhancing heat transfer even further. An example of heat exchangers using such baffles is described in U.S. Pat. No. 5,992,041.

It has been determined that efficient heat transfer to the glassmaking material can be obtained, without encountering the problems of previous heat transfer devices, if the passageway into which the hot combustion products are fed is configured such that the temperature of the surface of barrier 13 that is in contact with glassmaking material in passageway or passageways 12 does not exceed 871° C. (1600° F.) and the temperature of the glassmaking material in the passageways 12 does not reach or exceed the temperature at which the glassmaking material becomes adherent.

Typical components and ranges of the amounts thereof in various types of glass can be determined from published sources and from routine testing. For illustrative purposes, it can be mentioned that many types of glass may contain 55 wt. % to 85 wt. % silica ($SiO_2$), a total of 4.5 wt. % to 20 wt. % of $Na_2O$ and $K_2O$, a total of 0.05 wt. % to 25 wt. % of CaO and MgO, and 0 to 15 wt. % of $Al_2O_3$, and optionally other components such as $Fe_2O_3$, PbO (used in crystal glass and lead crystal), $B_2O_3$ (in borosilicate glass), and/or compounds that are or that contain oxides of Ti, S, Cr, Zr, Sb and/or Ba.

However, determination of the appropriate temperature at which the present invention is carried out is based on the properties of the mixture of ingredients of the glassmaking materials that are fed through the passageways 11 or 12 on their way to the glassmaking furnace. As is known in this field, those ingredients need to contain, or be capable upon application of high temperatures of being converted into, the desired glassmaking components. Suitable ingredients may include not only the aforementioned compounds but also precursors such as (but not limited to) alkali silicates, carbonates and hydroxides, and alkaline earth metals silicates, carbonates and hydroxides, as well as hydrates of any of the foregoing. Lower adherent temperatures (as that term is used herein) are generally associated with higher amounts of alkali and alkaline earth metal oxides and hydroxides.

For ingredients that become adherent at relatively lower temperatures (such as the ingredients used to make common soda lime glass or borosilicate glass), the temperature should not exceed 704° C. (1300° F.), preferably not exceed 649° C. (1200° F.) Since many different ingredients are used in glass making and the adherent characteristics of glassmaking materials not only depend on the ingredients, but also on their particle size distributions and on the metals used for barrier 13, the baffles or other metals that come in contact with the heated batch materials, tests to determine the maximum temperature to avoid sticking problems should be conducted. A recommended test procedure is to heat 250 grams of the glassmaking material, which is in free-flowing particulate form at room temperature, to a given temperature in a metal container (or a crucible) made of the same metal that as barrier 13 is to come in contact with the heated batch materials, and hold the heated material at that temperature for 30 minutes. The heated container is then inverted to assess the flowability characteristics of the material being thus tested. The lowest temperature at which at least 1% of the material adheres to the surface of the container after being subjected to these steps is defined as the "adherent temperature" of the material for the metal used for the container. The temperature to which the material is heated in unit 7 should not exceed the adherent temperature, and preferably should not exceed 56° C. (100° F.) below the adherent temperature. Satisfying these conditions ensure that glassmaking material will not become so hot that it softens and becomes sticky and then begins to plug the passageways or the openings through which heated glassmaking material leaves passageways 12.

It has been determined that these conditions can be satisfied for any given set of operating conditions, as described below, by providing that the heat flux (in units of energy per area of heat transfer surface at barrier 13 per unit of time) to all of the heat transfer surface of barrier 13 remains sufficiently low that the surface of barrier 13 that is exposed to the glassmaking material does not reach a temperature above 871° C. (1600° F.) and the temperature of the glassmaking material in passageways 12 does not reach or exceed the temperature at which it becomes adherent. The heat flux and temperature distributions over the barrier 13 can be estimated by radiative and convective heat transfer calculations taking into account, among other things, the incoming temperature and flow rate of the stream of hot combustion products, the temperature and flow rate of the glassmaking material entering heat exchange unit 7, the geometrical configuration of passageway 11, and the thermal and physical properties (i.e., conductivity, emissivity and thickness) of the barrier 13. Accurate prediction of the temperature distribution, while achievable, is generally difficult and requires an application of a detailed mathematical heat transfer model for optimization. A practical way to achieve the practice of the present invention is to provide a sufficiently high transfer surface area and a sufficiently large space of the passageway 11 into which the combustion products are fed. The geometry of the passageway 11 is selected to allow good radiative heat exchanges among all barrier walls and the hot combustion products. A long narrow passageway 11 tends to make the area near the inlet (nozzle 14) of the incoming hot combustion product stream too hot.

For example the aspect ratio of a rectangular passageway, defined as the ratio of the vertical length of the passageway to the shorter side of the rectangle, is preferably less than 5 and more preferably less than 3. A preferred method is to introduce the combustion products near the center of the bottom 16 through which nozzle 14 passes so that the distance of even the hottest portion of the combustion products from the heat transfer walls is sufficiently large that the heat flux to the barrier surfaces does not become too high that the barrier surface temperature to which the glassmaking material is exposed becomes too high. Thus, the factors that can most readily be adjusted as determinative in providing operation according to this invention are the total heat exchange surface area of barrier 13, and the distance from the point or points at which the combustion products are hottest as they are fed into the heat exchange unit (typically this is at the nozzle or nozzles 14 when the hot combustion products are fed into the passageway 11 of the heat exchange unit through one or more nozzles) to the nearest point or points on the inner surfaces of barrier 13 which are exposed to the hot combustion products.

Without intending to be bound by any particular explanation of the efficacy of this invention, it appears that the predominant mode of heat transfer from the combustion products to the barrier separating the combustion products from the glassmaking material is radiative rather than solely convective. Thus, the calculations that are carried out to determine a heat transfer surface area and suitable location of the inlet nozzle or nozzles are those carried out in the characterization of radiative heat transfer.

Figure 3:
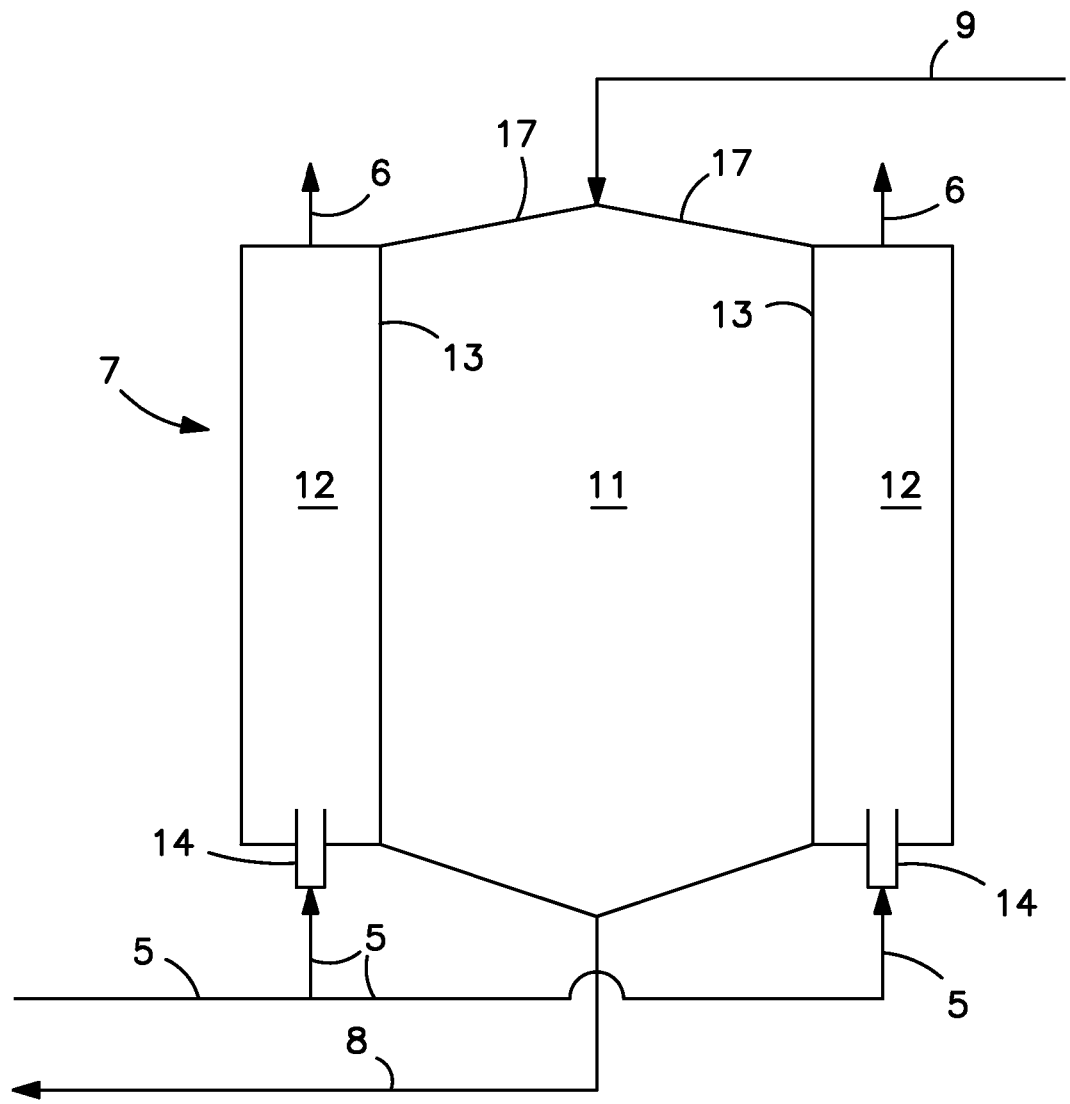
FIG. 3 is a cross-sectional view of an alternative heat exchange unit useful in the practice of the present invention.

FIG. 3 illustrates another useful embodiment of the present invention. In the embodiment of heat exchange unit 7 illustrated in FIG. 3, stream 9 of glassmaking material to be heated is fed into passageway 11 which is surrounded by passageway or passageways 12 through which hot combustion products 5 flow. The description above with respect to the embodiment depicted in FIG. 2 is also applicable to the embodiment depicted in FIG. 3, except that the glassmaking material passes through a passageway 11 which is centrally located with respect to the passageway or passageways 12 through which the hot combustion products flow. Preferably, 12 denotes a passageway completely surrounding central passageway 11, although such a surrounding passageway 12 can be divided into sectors by appropriately located vertical dividers. Whether or not such passageway 12 is integral or subdivided, it is preferred to feed the hot combustion products into passageway 12 as more than one stream, and preferably as 2-16 streams spaced around the bottom of passageway 12. Providing additional streams helps to provide relatively uniform temperature conditions around passageway 11, at any given elevation within passageway 12. The surface of barrier 13 that is exposed to the glassmaking material and whose temperature should not be permitted to exceed 871° C. (1600° F.) is in this embodiment the inner surface of barrier 13. Accordingly, observation of this condition is most effectively achieved by suitably dimensioning not only the overall heat transfer surface area of barrier 13, but also the geometry of the passageway 11 and the location of the one or more inlet nozzles 14 and their respective distances from barrier 13, so that again the heat flux from the passageway or passageways 12 to the surface of barrier 13 to which the combustion products are exposed can be suitably controlled so as to control the temperature of the barrier surface to which the glassmaking material is exposed.

Figure 4:
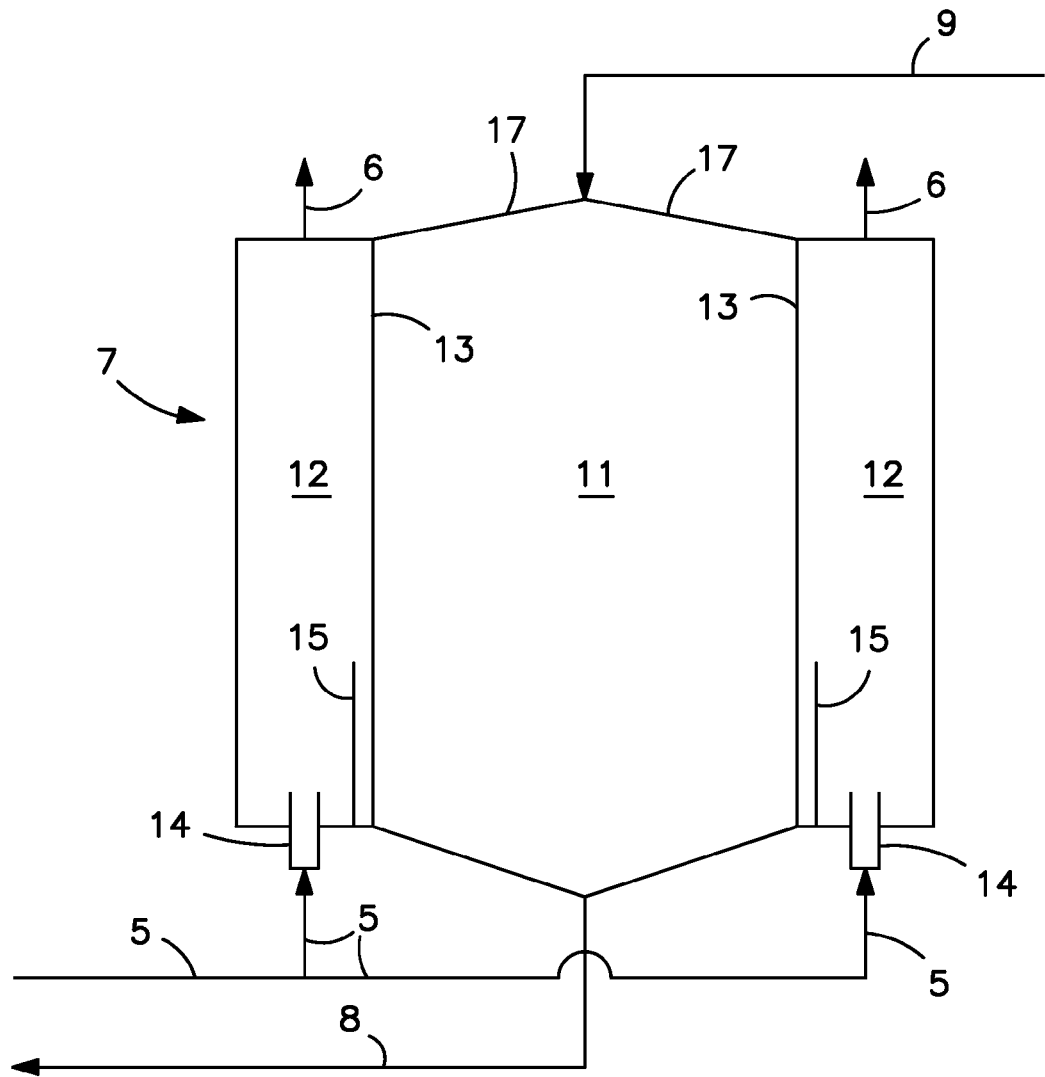
FIG. 4 is a cross-sectional view of an alternative heat exchange unit useful in the practice of the present invention.

FIG. 4 illustrates another useful embodiment of the present invention. FIG. 4 depicts the embodiment of FIG. 3, but to which has been added "shadow wall" 15. Each shadow wall 15 is preferably located between an inlet nozzle 14 and barrier 13, such that a straight line drawn from the opening of an inlet nozzle 14 to barrier 13 must pass through a shadow wall 15. The shadow wall is made of suitable refractory material, such as high-temperature-tolerant ceramic materials, that can withstand the temperature of the incoming hot combustion product stream. Each shadow wall has openings through it to only partially pass radiative heat flux from the hot combustion product stream toward barrier 13, thus reducing the radiative heat flux in a controlled fashion. The openings can be circular or polygonal, or can be in the form of elongated slots. Generally, the openings can occupy from 10% to 90% of the surface of the shadow wall; the particular percentage can readily be determined experimentally. The openings can be uniformly spaced on the surface of the shadow wall, or one may provide fewer openings nearer to the bottom (i.e. nearer to the point where the hot combustion products enter the passageway) and more openings further from the bottom. Shadow wall 15 may also absorb heat from the hot combustion products, and reradiate the heat toward the surface of barrier 13. These shadow walls 15 enable the operator to reduce the overall size of heat exchange unit 7 by reducing the heat flux from the hottest region of the passageway through which the combustion product is flowing, which is usually the region closest to where the hot combustion products enter that passageway. The effective dimensions of any shadow walls 15, especially the number of openings and their dimensions, can readily be determined experimentally.

It should of course be appreciated that embodiments of the type illustrated in FIG. 2, wherein the hot combustion products flow through a central passageway surrounded by one or more passageways through which glassmaking material passes, can also be adapted by inclusion of one or more shadow walls located between one or more of the inlets through which combustion products enter the central passageway, and the inner surface of barrier 13.

FIG. 5 illustrates one manner of conveying the heated glassmaking material to glass melting furnace 3 after the glassmaking material has passed through heat exchange unit 7. The heated glassmaking material 8 descends onto a bed 18 from which the glassmaking material passes into furnace 3. Bed 18 can be horizontal or sloped, i.e. still having a horizontal component. The material on bed 18 can move under the influence of gravity, but preferably is moved with the aid of a moving conveyor belt, rotary hearth, or similar equipment, such as a moving grate, that is commercially available for moving beds of heated solids. In this embodiment, the hot combustion products can flow into passageway 11 as a stream without the use of a nozzle. A dividing wall 20 can aid in retaining the hot glass melting atmosphere within furnace 3. The hot combustion products exit furnace 3 past the upper surface of bed 18 so that some heat exchange can occur even before the hot combustion products enter passageway 11 to exchange heat to material in passageway or passageways 12.

Figure 6:
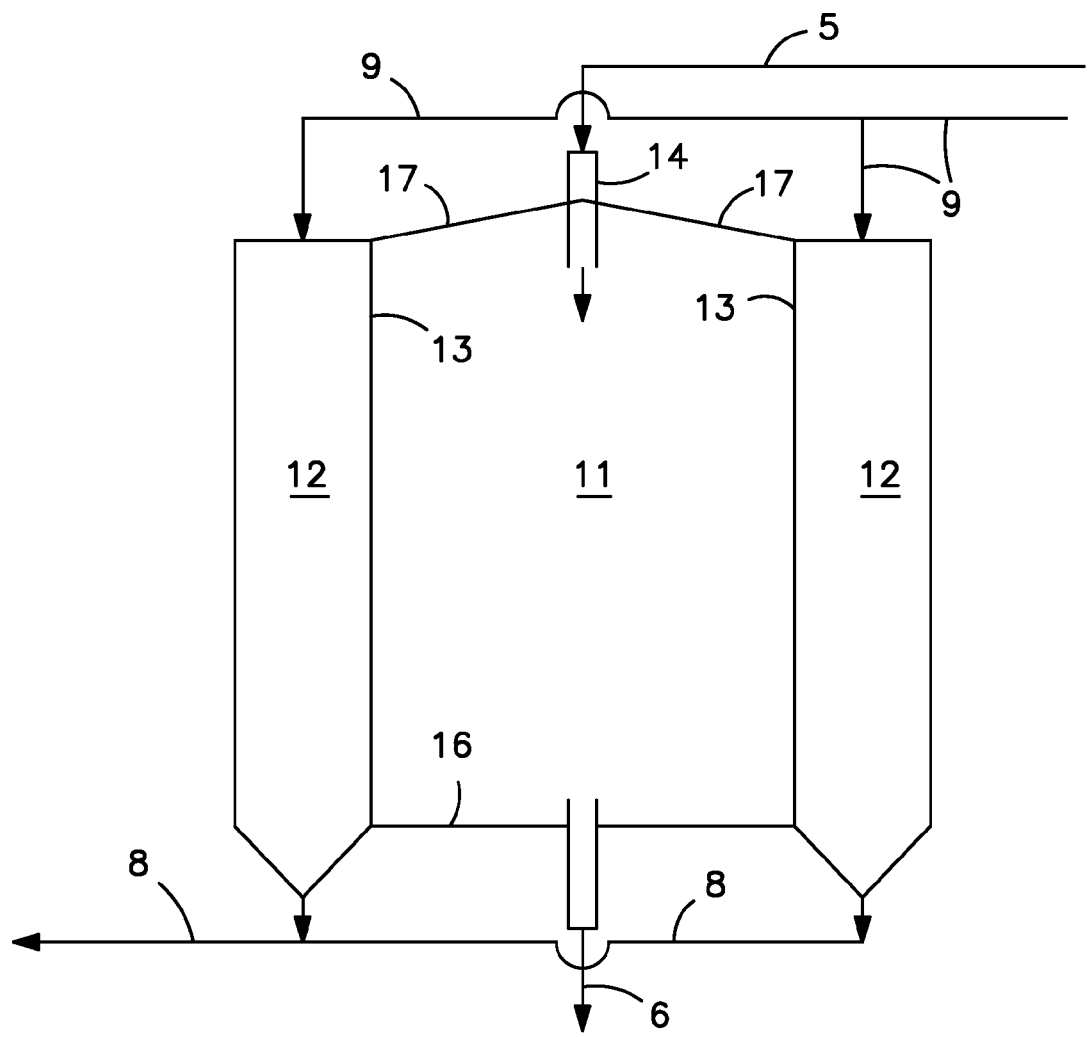
FIG. 6 is a cross-sectional view of an alternative heat exchange unit useful in the practice of the present invention.

FIG. 6 illustrates another embodiment useful in the present invention. In this embodiment, the hot combustion products and the glassmaking material flow cocurrently rather than countercurrently as illustrated in FIGS. 2, 3 and 4. The reference numerals employed in both FIGS. 2 and 5 have the same meanings in FIG. 5 as they do in FIG. 2. The difference, as can be seen, is that hot combustion products are fed through inlet nozzle 14 into the top of passageway 11 and stream 6 of cooled combustion products exit from the bottom of passageway 11. It should be recognized that the embodiments of FIGS. 3 and 4 can also be adapted to provide cocurrent flow of the heat-exchanging streams.

Figure 7:
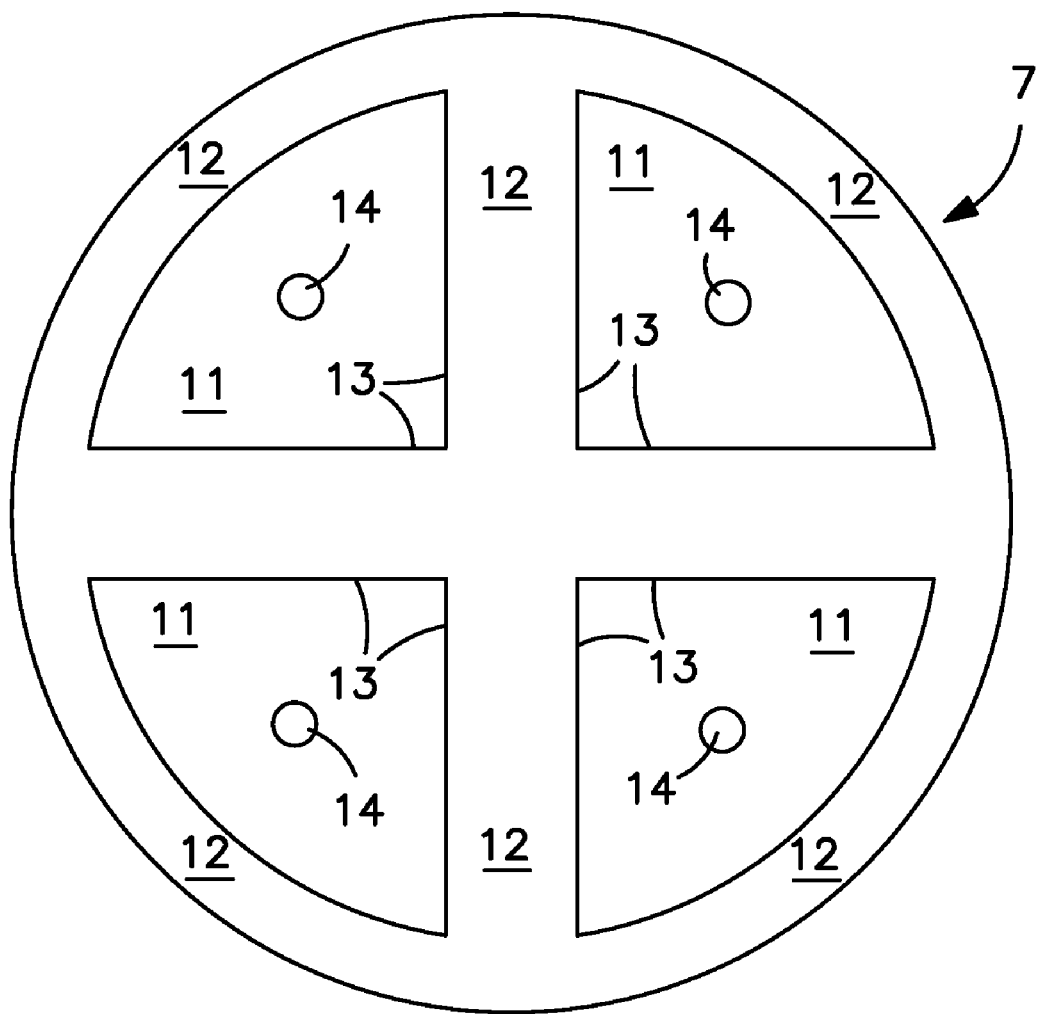
FIG. 7 is a cross-sectional view, seen from above, of an alternate embodiment useful in the practice of the present invention.

The present invention can also be carried out in embodiments in which two or more, typically 2-10 and preferably 2-6, passageways 11 each bounded by its own barrier 13 are situated close enough to each other that passageways 12 are located between two (or more) passageways 11. One such embodiment is shown in FIG. 7, in which four passageways 11 each receive through an inlet 14 a portion of the hot combustion gases which then flow upward through the passageways 11. The four passageways 11 are located with respect to each other so that some passageways 12 are defined between pairs of adjacent passageways 11. Heat flows through barriers 13. Preferably, the hot combustion products pass through passageways 11 and the glassmaking material flows through passageways 12, in which case heat flows from passageways 11 into passageways 12. The apparatus shown in FIG. 7 can also be used so that hot combustion products pass through passageways 12 and glassmaking material flows through the passageways 11, but this is less preferred as the closer dimensions in the passageways 12 would necessitate providing shadow walls or the equivalent to keep the heat flux to the walls 13 from being excessive.

As noted above, one significant advantage of the present invention is that more of the energy content of the stream of hot combustion products can be used to advantage, even though its temperature is higher as being obtained from oxy-fuel combustion, without requiring any significant reduction in the temperature of the stream such as by adding a diluent fluid stream. Other advantages are inherent in the fact that the heat transfer between the hot combustion products and the glassmaking material is indirect, which means that there is no risk of entraining dust or other particulates in the incoming glassmaking material, nor of contaminating the exiting combustion product stream with entrained dust and other particulate matter, nor of substantially oxidizing the carbon content of the batch materials which is important to make amber color glasses.

The fact that the present invention can take advantage of an incoming combustion product stream having a higher temperature than prior practice thought could be employed to heat incoming glassmaking material also means that the temperature of the cooled combustion product stream that exits the heat transfer unit 7 and still be high enough that this stream can be used for additional heat exchange. For instance, that exiting combustion product stream 6 can be fed to a conventional heat exchanger that exchanges heat from a combustion product stream having a temperature on the order of 538° C. (1000° F.) or less, by convective heat exchange with incoming glassmaking material, with oxidant or fuel to be subsequently combusted in the glass melting furnace, or with other gaseous, liquid or solid material. As a further advantageous embodiment, the glassmaking material that is fed as stream 9 can have already been heated, for instance by passage through such a conventional convective heat exchange unit, before it is fed as stream 9 to the heat exchange unit described herein. The heat exchange can be with cooled but still heat-bearing combustion products, or with a stream of other hot material.

The stream of cooled combustion products emerging from heat transfer unit 7, or from a subsequent heat exchanger, can if desired be subjected to treatment steps that may be desirable or necessary before the stream is discharged to the atmosphere or employed as a feed stream to a chemical processing stage. For instance, the stream can be passed through an electrostatic precipitator or equivalent apparatus to remove fine particulate contaminants. The stream can be treated to remove gaseous atmospheric pollutants such as sulfur oxides, such as by contacting the stream with a suitable absorbent or reactant such as $Ca(OH)_2$ or sodium carbonate.

A sample set of calculations, based on a hypothetical set of operating conditions that could be encountered in an actual glassmaking operation, are described in the following example.

EXAMPLE

A 450 short tpd flint container glass melting furnace is equipped with a high temperature radiative batch/cullet preheater and a conventional low temperature batch/cullet preheater, installed in series. The furnace is fired with 47,000 SCFH of natural gas and 105,000 SCFH of commercial oxygen (92% $O_2$, 4% $N_2$ and 4% Ar). The total exhaust gas flow rate from the melting furnace is about 192,000 SCFH which includes the gases generated from the normal container batch materials and some air infiltration. The temperature of exhaust gas as it leaves the melting furnace is 1371° C. (2500° F.). An unheated batch/cullet mixture (50/50 by weight) is first dried and heated to 158° C. (316° F.) in the conventional low temperature batch cullet preheater. A suitable low temperature batch/cullet preheater is described in U.S. Pat. Nos. 5,412,882 and 5,526,580. It takes in the cooled exhaust gas from the radiative batch/cullet preheater. The preheated batch/cullet mixture from the conventional low temperature batch/cullet preheater is introduced into the radiative batch/cullet preheater of the present invention and heated further to 566° C. (1050° F.) by heat exchange with the exhaust gas from the melting furnace which is introduced through a refractory lined duct to the bottom center of the counter-current radiative batch/cullet preheater. The gas temperature at nozzle 14 is about 1274° C. (2325° F.) due to 10,000 SCFH of cold air infiltration and wall heat losses of about 0.5 MMBtu/hr after the flue gas left the furnace. In the radiative batch/cullet preheater 7.2 MMBtu/hr of energy is required to preheat batch and cullet from the aforementioned 158° C. (316° F.) to 566° C. (1050° F.). Approximate radiative heat transfer calculations show that an average heat transfer rate of about 6325 $Btu/ft^2/hr$ to the barrier 13 can be obtained by gas radiation in passageway 11. Thus, the total heat transfer surface area of barrier 13 required becomes about 1164 $ft^2$. The average gas and the average barrier surface temperatures may change from 960° C. (1760° F.) and 732° C. (1350° F.) at the hot end to 538° C. (1000° F.) and 371° C. (700° F.) at the cold end. For example, the approximate dimensions of a rectangular passageway of 25'W ×10'D×16.6'H may be built and tested. Due to the small aspect ratios of the large rectangular passageway 11 in this example, the actual gas temperature distribution along the height of the preheater may become more uniform, for example 871° C. (1600° F.) in the hot end and 593° C. (1100° F.) in the cold end, and resulting in lower heat transfer. By increasing the height while keeping the same total area, for example to the dimensions of 10'W×10'D×29.1'H, the gas and barrier temperature distribution along the height can be made closer to the desired design conditions. The final more fully optimized determination of the optimum dimensions is then preferably obtained by detailed radiative heat transfer calculations using a three dimensional mathematical model and/or pilot scale experiments.

What is claimed is:

1. A glassmelting method comprising
(A) passing heated glassmaking material into a glassmelting furnace;
(B) combusting fuel with oxidant having an overall average oxygen content of at least 35 vol. % oxygen to produce heat for melting said heated glassmaking material in said glassmelting furnace and produce hot combustion products having a temperature greater than 982° C. (1800° F.);
(C) withdrawing said hot combustion products from said glassmelting furnace and feeding said hot combustion products into a first passageway of a heat exchange unit, wherein the temperature of said hot combustion products entering said first passageway is at least 982° C. (1800° F.);
(D) flowing said hot combustion products through and out of said first passageway;
(E) feeding glassmaking material into and through a second passageway of said heat exchange unit that is separated from said first passageway by a barrier through which said glassmaking material and said hot combustion products cannot pass and through which heat from said hot combustion products passes to said glassmaking material to form said heated glassmaking material; and
(F) maintaining heat flux from hot combustion products in said first passageway to said barrier sufficient that the temperature of the surface of said barrier that is in contact with said glassmaking material does not exceed 871° C. (1600° F.) and that the temperature of said glassmaking material does not reach or exceed the temperature at which the glassmaking material becomes adherent.

2. A method according to claim 1 wherein in step (F) the heat flux from hot combustion products in said first passageway to said barrier sufficient that the temperature of the surface of said barrier that is in contact with said glassmaking material does not exceed 760° C. (1400° F.) and that the temperature of said glassmaking material does not exceed 649° C. (1200° F.).

3. A method according to claim 1 wherein in step (F) the heat flux from hot combustion products in said first passageway to said barrier sufficient that the temperature of the surface of said barrier that is in contact with said glassmaking material does not exceed 649° C. (1200° F.) and that the temperature of said glassmaking material does not exceed 538° C. (1000° F.).

4. A method according to claim 1 wherein the hot combustion products fed in step (D) have a temperature of at least 1093° C. (2000° F.).

5. A method according to claim 1 wherein the hot combustion products fed in step (D) have a temperature of at least 1204° C. (2200° F.).

6. A method according to claim 1 wherein the oxidant combusted in step (B) has an overall average oxygen content of at least 50 vol. % oxygen.

7. A method according to claim 1 wherein the oxidant combusted in step (B) has an overall average oxygen content of at least 90 vol. % oxygen.

8. A method according to claim 1 wherein a portion of the heat that flows from said hot combustion products to said barrier is absorbed in a shadow wall in said first passageway and reduces the direct radiative heat transfer from said hot combustion products to said barrier.

9. A method according to claim 1 wherein said glassmaking material passes through said second passageway countercurrent to the flow of said hot combustion products through said first passageway.

10. A method according to claim 1 wherein said glassmaking material passes through said second passageway cocurrent with the flow of said hot combustion products through said first passageway.

11. A method according to claim 1 wherein before said glassmaking material is fed into said second passageway it is heated in a second heat exchange unit by indirect heat exchange.

12. A method according to claim 1 wherein said combustion products after flowing out of said first passageway are cooled in a second heat exchange unit by indirect heat exchange.

13. A method according to claim 1 wherein before said glassmaking material is fed into said second passageway it is heated in a second heat exchange unit by indirect heat exchange with said combustion products that have flowed out of said first passageway.

14. A method according to claim 1 wherein hot combustion products withdrawn from said glassmelting furnace, before passing into said first passageway, flow past a bed of said glassmaking material that has passed through said second passageway, and exchange heat to said bed of glassmaking material.

15. A method according to claim 1 wherein at least one offgas stream is withdrawn from said second passageway and fed into said first passageway.

16. A glassmelting method comprising
(A) passing heated glassmaking material into a glassmelting furnace;
(B) combusting fuel with oxidant having an overall average oxygen content of at least 35 vol. % oxygen to produce heat for melting said heated glassmaking material in said glassmelting furnace and produce hot combustion products having a temperature greater than 982° C. (1800° F.);
(C) withdrawing said hot combustion products from said glassmelting furnace and feeding said hot combustion products into each of 2 to 10 first passageways of a heat exchange unit, wherein the temperature of said hot combustion products entering said first passageways is at least 982° C. (1800° F.);
(D) flowing said hot combustion products through and out of said first passageways;
(E) feeding glassmaking material into and through a plurality of second passageways of said heat exchange unit that are separated from said first passageways by barriers through which said glassmaking material and said hot combustion products cannot pass and through which heat from said hot combustion products passes to said glassmaking material to form said heated glassmaking material; and (F) maintaining heat flux from hot combustion products in said first passageways to said barriers sufficient that the temperature of the surfaces of said barriers that are in contact with said glassmaking material does not exceed 871° C. (1600° F.) and that the temperature of said glassmaking material does not reach or exceed the temperature at which the glassmaking material becomes adherent.

17. A glassmelting method comprising (A) passing heated glassmaking material into a glassmelting furnace;

(B) combusting fuel with oxidant having an overall average oxygen content of at least 35 vol. % oxygen to produce heat for melting said heated glassmaking material in said glassmelting furnace and produce hot combustion products having a temperature greater than 982° C. (1800° F.);

(C) withdrawing said hot combustion products from said glassmelting furnace and feeding said hot combustion products into a first passageway of a heat exchange unit, wherein the temperature of said hot combustion products entering said first passageway is at least 982° C. (1800° F.);

(D) flowing said hot combustion products through and out of said first passageway;

(E) feeding glassmaking material into and through a second passageway of said heat exchange unit that is separated from said first passageway by a metal barrier through which said glassmaking material and said hot combustion products cannot pass and through which heat from said hot combustion products passes to said glassmaking material to form said heated glassmaking material; and (F) maintaining heat flux from hot combustion products in said first passageway to said barrier sufficient that the temperature of the surface of said barrier that is in contact with said glassmaking material does not exceed 871° C. (1600° F.) and that the temperature of said glassmaking material does not reach or exceed the temperature at which the glassmaking material becomes adherent.

18. A method according to claim 17 wherein a portion of the heat that flows from said hot combustion products to said barrier is absorbed in a shadow wall in said first passageway and reduces the direct radiative heat transfer from said hot combustion products to said barrier.

* * * * *